United States Patent [19]
Poe et al.

[11] Patent Number: 5,284,007
[45] Date of Patent: Feb. 8, 1994

[54] LAWN MOWER MOUNTED LEAF MULCHER

[76] Inventors: William R. Poe, 1209 Richards Ave.; Kirk Sawall, 1008 Montrose Ave., both of Colorado Springs, Colo. 80906

[21] Appl. No.: 13,312

[22] Filed: Feb. 4, 1993

[51] Int. Cl.$^5$ ............................................. A01D 75/00
[52] U.S. Cl. ................................... 56/320.2; 56/17.4; 56/255
[58] Field of Search ...................... 56/13.3, 13.4, 17.4, 56/13.8, 255, 320.1, 320.2, DIG. 8, DIG. 9

[56] References Cited
U.S. PATENT DOCUMENTS

| | | | |
|---|---|---|---|
| 3,706,189 | 12/1972 | Rutherford | 56/320.2 X |
| 4,189,904 | 2/1980 | Paker | 56/320.2 X |
| 4,306,409 | 12/1981 | Wulfers | 56/320.2 |
| 4,864,808 | 9/1989 | Weber | 56/320.2 |
| 5,048,279 | 9/1991 | Badawey et al. | 56/320.2 |

*Primary Examiner*—David J. Bagnell

[57] ABSTRACT

A mulching and shredding attachment for use on lawn mowers or lawn vacuums held in place by a bracket which uses a lever (44) and a clevis pin (54) so that the mulcher can easily be removed or lifted up while remaining attached to said lawn equipment. The mulcher is made of rigid material and shaped into a chute (10) and uses a bottom plate (24) and an adjustable deflector (20) which allows lawn debris to be directed into the lawn. Inside the mulcher chute (10) is a cutter grid with sharpened blades (16) positioned parallel with the natural travel of exiting lawn debris as it passes through the mulcher chute (10). The cutter grid is fastened by a rod (34) which permits up and down movement of said cutter grid. This movement is limited by means of a lever (32) attached to the upper end of the cutter grid as it comes in contact with the upper inside surface of the mulcher chute (10). The horizonal position of the sharpened blades (30) allows a variety of materials, including leaves, pine needles, twigs, ect. to be properly shredded and mulched, even when wet.

9 Claims, 4 Drawing Sheets

LAWN MOWER MOUNTED LEAF MULCHER

BACKGROUND

1. Field of Invention

This invention relates to the reduction of leaves, pine needles, and small twigs, specifically to reduce labor time, garbage dump space and cost needed to dispose of said waste.

2. Description of Prior Art

Disposing of leaf waste matter has been an ongoing problem. Various methods have been employed for their disposal. Generally they are raked by hand into piles and inserted into plastic bags. These bags are then taken to garbage dumps. This has proven costly and time consuming. The environment has also been endangered as garbage dump space decreases.

The problem was partially solved with the implementation of mulching lawn mowers. This has been hindered by the cost of replacing an existing lawn mower with a new mulching mower. Also mulching lawn mowers are limited in their use. Leaf texture and thickness vary thus giving inconsistent and unsatisfactory results. The problem is aggravated further when the leaves become damp.

To provide a solution to the mentioned problems various inventors created attachments to be used with lawn mowers. In particular the simplest of these incorporates a method of blocking the discharge opening and constraining the residue in the mower housing to permit the blade to have a longer time to reduce the residue. Examples of this method are shown in the following U.S. patents.

U.S. Pat. No. 4,864,808 to Paker, 1980 Feb. 26, has no means to prevent the openings from becoming plugged when heavy concentrations of residue gather on the vent holes. Ventilation holes must remain open and be of sufficient size to allow the mower to operate properly. This is an increasingly important issue since more and more mowers are incorporating blades that are shaped to produce high air volume. The mulching grid in U.S. Pat. No. 4,306,409 to Wulfers, 1981 Dec 22, provides for ventilation with cleaning capability but the unconstrained motion of the flexible chain does not control the size of the ventilation openings, thus allowing uneven discharges to occur. Also the danger of blade and chain contact exists due to the flexible motion of the chains.

U.S. Pat. No. 4,864,808 to Weber, 1989 Sep. 12, uses a grid comprised of rods which pulverize leaves and lawn clippings into mulch. This is limited as the leaves must be spread evenly across the lawn to avoid clogging and thus having residue attach to the under side of the mower deck. Further the rods do not allow a cutting action in the event of small twigs and pine needles. U.S. Pat. No. 4,135,351 to Akgulian, 1979 Jan 23, incorporates an assembly having a mower housing in which air holes are offset in two plates. In order for this to work properly constant attention must be given to the vent holes as they become plugged. Also the aforementioned limitation on leaf thickness is a problem. In U.S. Pat. No. 4,890,446 to Isreal, 1990 Jan 2, an attachment is used limiting lawn debris to the under side of the mower deck. Again leaf thickness poses a threat to the effectiveness of this attachment. Also because of the vast variety of mower decks this attachment would require continual design changes. In U.S. Pat. No. 4,938,011 to Pernia, 1990 Jul 3, the problem also exists mower size and shape require a vast variety of design changes. U.S. Pat. No. 5,142,851 to Schueller, Nickel, and Rauwerdink, 1992 Sep 1, utilizes a post-processor having a housing in communication with the discharge chute of a lawn mower. The housing contains a blade which is operated by pulleys and a belt which is rotated by a pulley attached to the mower motor blade shaft. Due to the time involved in attaching the apparatus to the mower and that the belt is in the debris area, the practicality is considerably reduced. Also it limits the general public's ability to attach this themselves. And many mower motors do not have the space or the ability to utilize a second pulley that is needed to operate the secondary cutter blade.

In each of the above mentioned patents, there are several shortcomings and problems that need to be solved. First the simplicity with which a mulching attachment can be attached to a variety of lawn mowers, as well as use on lawn vacuums, thus allowing a person not skilled in mechanics to perform this. This in turn should allow simple removal as well. Second, the ability to cut debris as it exits the mower deck, thereby eliminating stress to the lawn mower engine. And it must do this regardless of conditions of the leaves, whether they are spread evenly across the lawn or in piles. Also the ability to cut pine needles and small twigs is needed to be an effective tool. This should prove to be the case even when leaves are wet. Third, clogging must be reduced to a minimum even under the aforementioned conditions.

OBJECTS AND ADVANTAGES

Accordingly, the objects and advantages of the invention are to provide a low cost leaf mulching attachment that can easily be attached to the majority of rotary lawn mowers on the current market. The simplicity is shown by the fact that a person not skilled in the mechanical field can attach it to their lawn mower. It can easily be removed or lifted up to allow other accessories to be attached to lawn equipment. The mulcher utilizes a cutting grid that is self cleaning while allowing lawn debris to be shred as it exits out of the mulcher housing. This shall be the case under a variety of conditions and in the presence of pine needles and small twigs. The ability of the mulcher to perform improves as the leaves become thicker. It will even mulch large piles of leaves. The self cleaning ability of the mulcher allows it to successfully shred and mulch wet leaves. Further advantages will become apparent from the ensuing description and drawings.

DRAWING FIGURES

LEAF MULCHER ATTACHMENT DESCRIPTION

Figure 1:
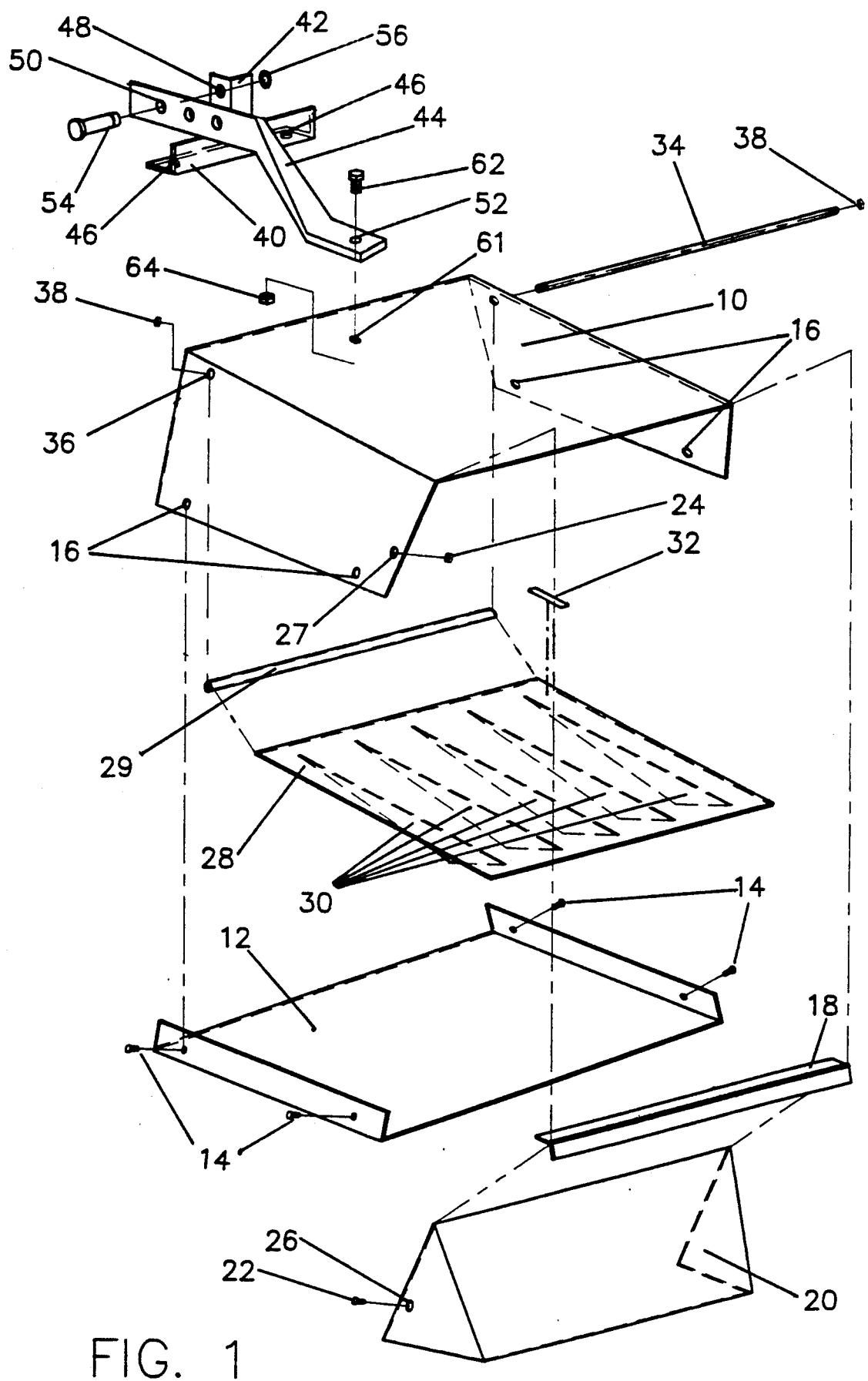
FIG. 1 shows an exploded veiw of the parts that comprise the mulching attachment according to the invention.

FIG. 1 shows the mulching attachment separated into the parts that comprise the invention. The mulcher employs a housing of rigid sheet material which is folded at two points equal to the measurements of the lawn mower deck height. This becomes a discharge chute 10 opened on each end. The bottom is open and is then covered by a plate 12 of rigid sheet material that is folded to conform to match bottom shape of discharge chute 10. The folded edges shall extend upward of sufficient distance to allow holes 16 to be drilled through plate 12 and chute 10 thus allowing bottom plate 12 to be attached by screws 14 inserted through holes 16. At one end of chute 10 along the upper edge, a hinge 18 is welded. To hinge 18 a deflector 20 made of rigid sheet material and folded at the ends at right angles is attached so as to maintain downward motion of all air as it exits discharge chute 10. Attachment of deflector 20 to hinge 18 is by welding. Position of deflector 20 is determined by bolt 22 and nut 24 positioned through hole 26 and hole 27. Air travel is now directed downward.

Figure 2:
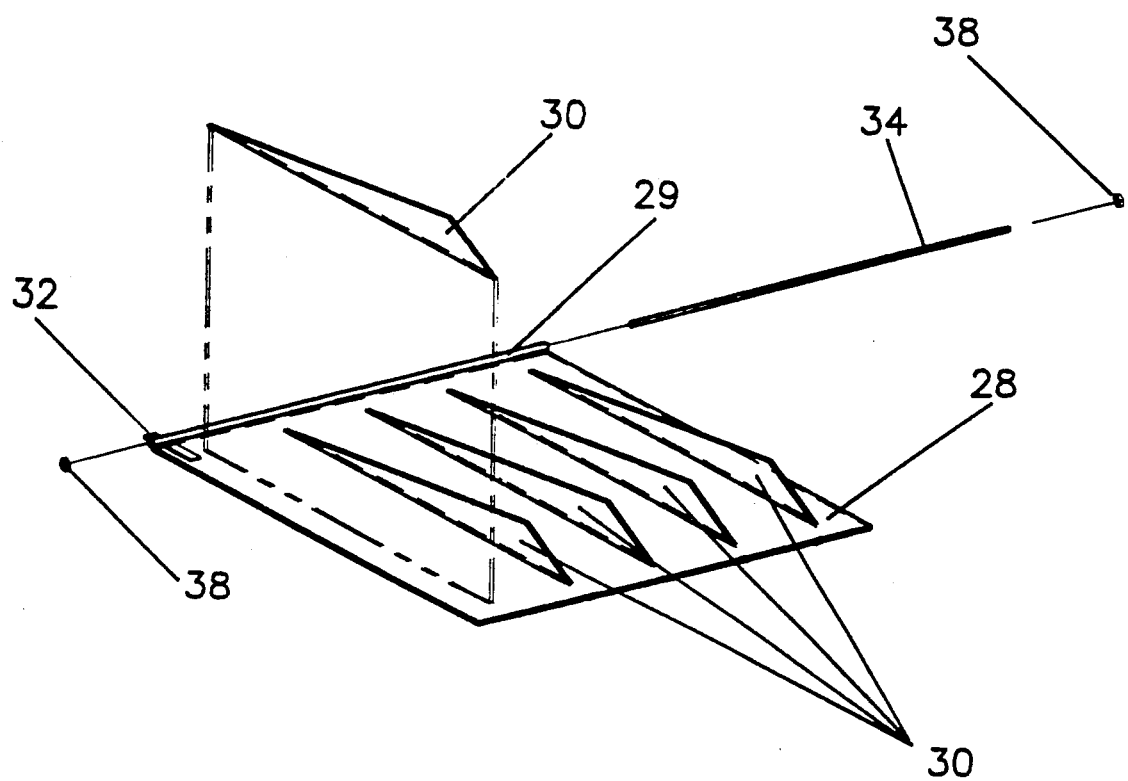
FIG. 2 shows the cutter grid and setting of blades from the bottom view.
Figure 3:
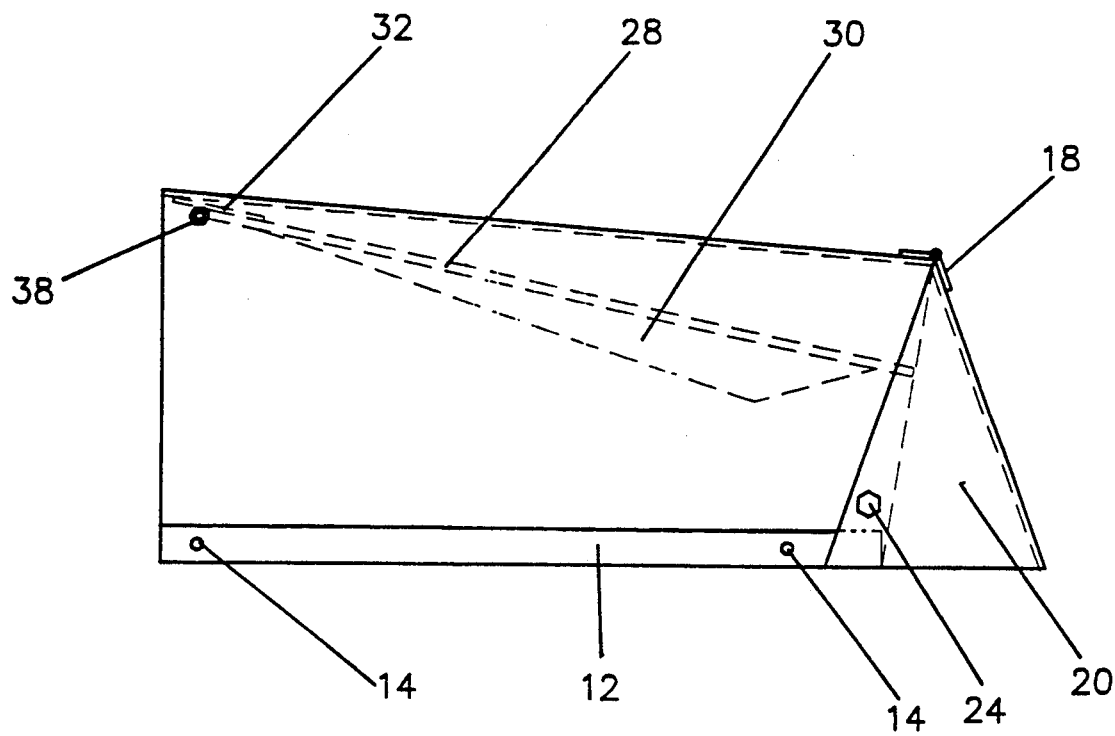
FIG. 3 shows the cutter grid in place in relation to the mulcher housing, and is a view from the side.

The cutter grid is comprised of five portions: a blade holder 28, the blades 30, lever 32, rod 34 and nut 38 as shown in FIGS. 1, 2 and 3. Blade holder 28 is made of rigid sheet material, preferably stainless steel that equals the size of the top of discharge chute 10. To one edge a tube 29 with inside diameter that matches rod 34 diameter is welded to edge of blade holder 28.

FIG. 2 shows the cutter grid with blades 30 in their determined position. Blades 30 shall be rigid sheet material preferrably stainless steel and of angular shape. Longest edge of blades 30 is sharpened. As shown in FIG. 2 blades 30 are welded at right angles to blade holder 28. Welding shall be done along unsharpened edge, to blade holder 28. Spacing of blades 30 are such as to provide a selected degree of filtering. The lowest end of blades 30 shall be placed at edge where tube 29 was welded. At this point lever 32 shall be welded so as to extend beyond the edge of blade holder 28 and tube 29.

FIG. 3 shows how lever 32 limits the angle of the cutter grid, allowing the opposite end to hang approximately half way down near exit of discharge chute 10. The cutter grid is positioned inside discharge chute 10 at the top. Tube 29 is routed between holes 36. Rod 34 is inserted through hole 36 and through tube 29 and back out opposite hole 36. Rod 34 is held in place by nut 38.

Figure 4:
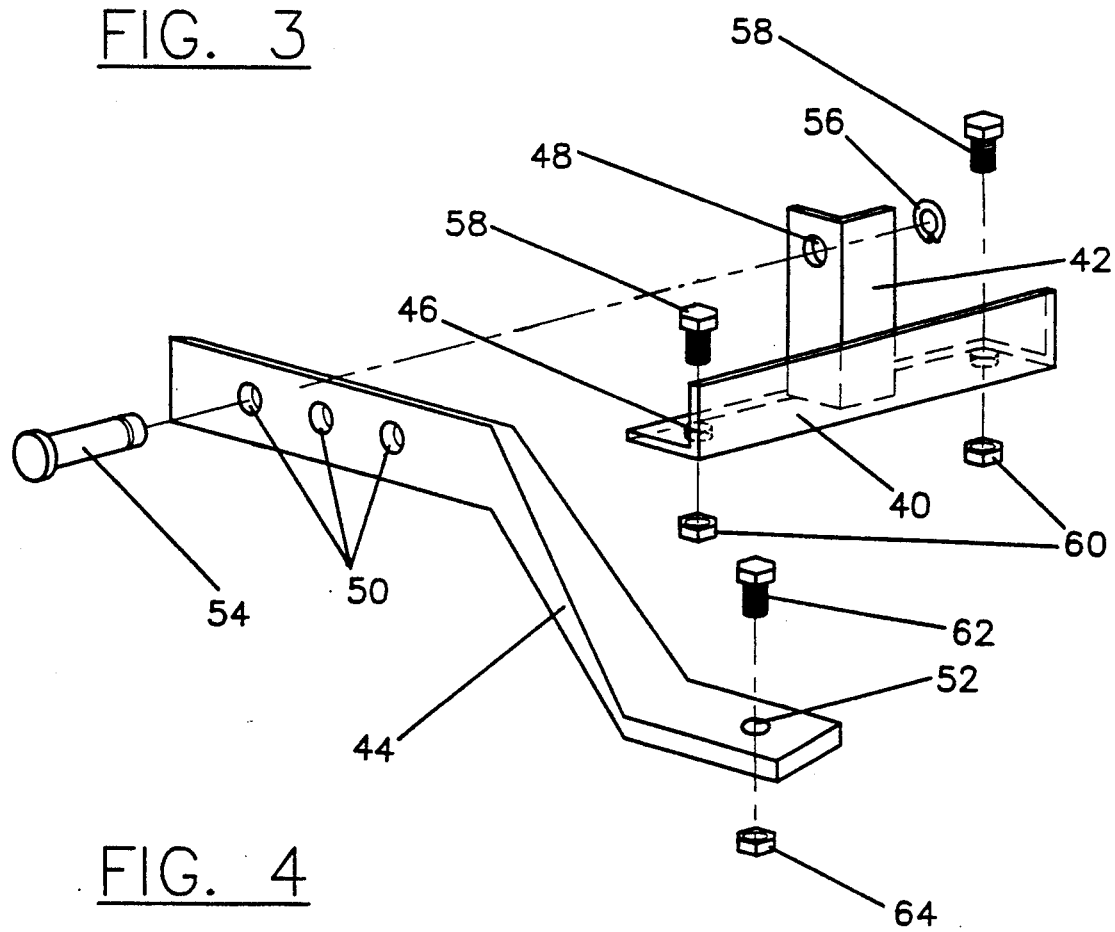
FIG. 4 shows the ajustable bracket used to attach mulcher to lawn mower deck.
Figure 5:
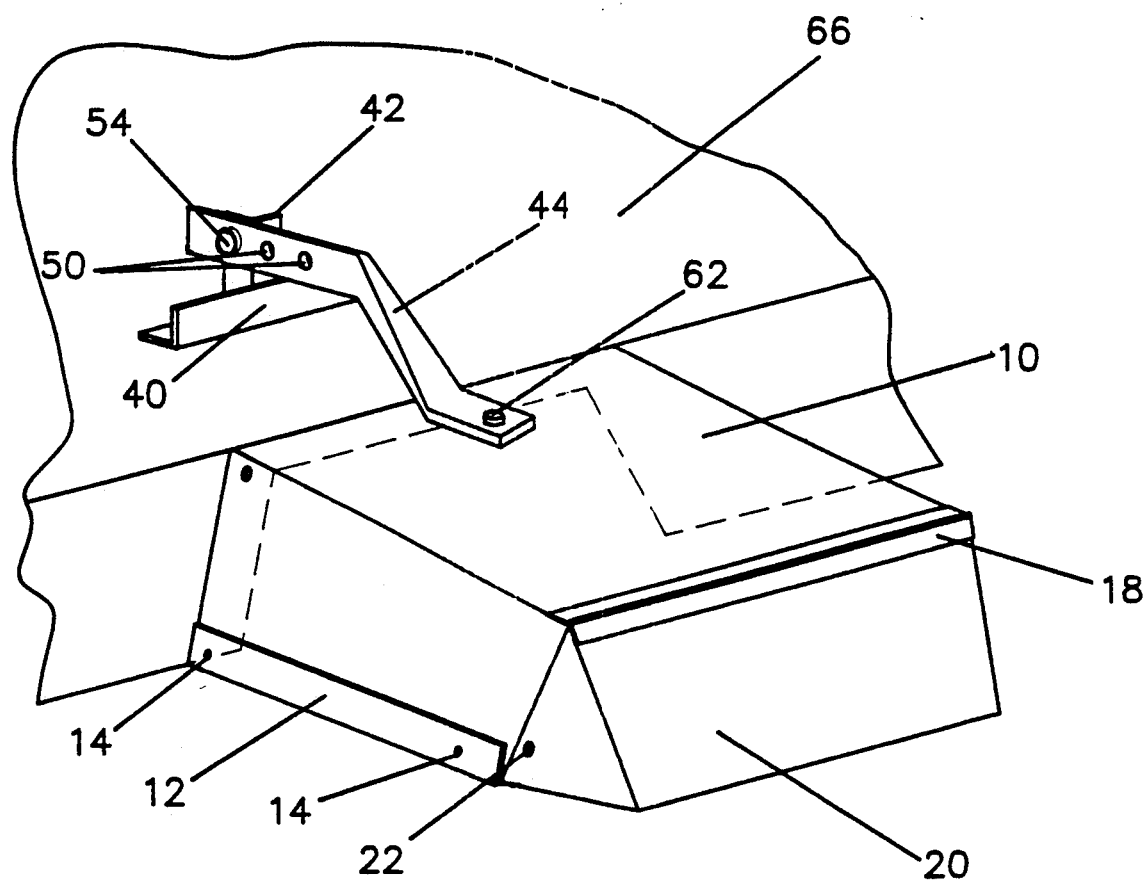
FIG. 5 shows the mulcher attachment mounted to the preferred location on a lawn mower.

FIGS. 4 and 5 show the parts of the bracket used to attach the mulcher to a mower deck 66. The portions of the bracket are a angle iron 40 with holes 46 drilled at each end on the same side. To angle iron 40 is welded angle iron 42. Angle iron 42 is of less length than angle iron 40 and welded at a right angle extending upward in middle of angle iron 40. At top of angle iron 42 is hole 48. Attached to angle iron 42 is lever 44 as shown in FIG. 5. Lever 44 is rigid material preferably of casted steel. Lever 44 is of length and shape to extend from top of angle iron 42 to top of chute 10 and is attached to chute 10 by means of bolt 62 through hole 52 and hole 61 and fastened by nut 64 as shown in FIGS. 4 and 5. At opposite end of lever 44 from hole 52 shall be a hole 50. Hole 50 shall be a plural amount to allow lever 44 to have several positions. Attachment of lever 44 to angle iron 42 shall be by means of a clevis pin 54 through hole 48 and hole 50 and fastened by clevis 56. The bracket is attached to mower deck 66 by means of bolt 58 through hole 46 and the holes drilled in the mower deck that will be of size and distance to match holes 46. Nut 60 is attached to bolt 58 under the mower deck.

LEAF MULCHER ATTACHMENT OPERATION

The mulcher is attached to the mower deck 66 by means of the bracket as shown in FIGS. 4 and 5. The bracket is positioned on the lawn mower deck 66 in the position where the mulcher inlet side covers the mower discharge opening. Holes are drilled through the mower deck 66 in the same position and size of holes 46 on angle iron 40. This allows angle iron 40 to be attached to mower deck 66 by means of bolts 58 and nuts 60. The clevis pin 54 is installed through hole 48 and adjacent hole 50 after mulcher is aligned with mower deck 66, thus allowing the mulcher to rest against the mower deck as shown in FIG. 5.

Use of the clevis pin allows free movement of the lever 44 so the mulcher can easily be raised up and out of the way of any objects or to enter through gates, without removing the mulcher. The clevis pin allows for easy removal of the mulcher without removing the bracket. This will also allow the mulcher to be raised, in turn permitting other attachments to be applied to the mower deck 66. With the mulching attachment mounted in place on the lawn mower deck 66 and the mower in operation, leaves, pine needles and small twigs circulate in the direction of the lawn mower blade rotation. Air movement is directed out of the lawn mower discharge chute and through the discharge chute housing 10. Along with the exiting air are carried the leaves, pine needles, and twigs. As these pass through the discharge chute 10 debris passes along the sharpened edges of the cutting blades 30. Slicing action decreases the size of the debris. The air movement flowing through the discharge chute 10 is continually being directed downward into the lawn by means of the discharge deflector 20. This allows fully cut residue to be forced into the lawn.

The blades 30 are of sufficient number to span the width of the lawn mower discharge opening and are spaced to allow sufficient air movement. Thus maximum speed and travel of debris to create a slicing action is maintained. The cutter grid is held at an angled position by the lever 32 as shown in FIGS. 2 and 3. This allows free movement upward and downward to ensure that the blades remain free of debris. This also allows an upward expansion of the inside area of the deflector chute 10 as debris mass increases on the lawn. The cutter grid is limited as to how far down it can fall, by means of the lever 32 on the cutter grid. This allows sufficient area inside of discharge chute 10 for some debris to exit uncut. As the mower continues to work toward the center of the lawn, the uncut debris is passed through the mulcher again. As the uncut matter increases in mass, pressure within the mulcher increases. Thereby cutting and mulching are enchanced while maintaining an even distribution of mulch matter into the lawn.

Because the mulcher is enclosed on all sides air pressure and direction is maintained at a steady flow. The deflector 20 limits the mulch matter to the area of the next pass of the lawn mower which in turn keeps the matter in a controlled area. At the same time, fully cut matter is mulched into the lawn.

CONCLUSION, RAMIFICATION AND SCOPE

Thus the reader will see from the above description that the mulcher of the invention provides a versatile, yet inexpensive device that can be used by most persons who own a lawn mower. It can be seen that the leaf mulcher attachment can easily be installed to a variety of lawn mowers. Those skilled in the art will appreciate the value of the mulcher's ability to easily be raised in order to clear gates and other obstacles. Also the ability to remove the mulcher attachment in a minimal amount of time permits the operator to install any other mower attachments as needed. Those skilled in the art will envision many other possible variations and are within it's scope. For example, the cutter blades 30 used in the cutter grid assembly could be fabricated from a variety of materials. The method of sharpening can be varied. For example, a serrated edge or it may be honed to a fine edge. The height, size, number, and spacing of the blades could be altered to accommodate mower discharge openings without changing the function. The horizontal angle of the cutting grid assembly allows for a cutting process rather than relying on pressure to shred lawn debris. Also the position within the discharge chute is not limited to the top.

The discharge chute of the mulcher can be constructed of a variety of materials, such as sheet matal, aluminum, plastic, or any other rigid material. The shape is not limited to the drawings shown. As an example, a round tube that covers the lawn mower discharge opening. With the cutter grid inserted inside the tube the results will remain the same.

The deflector 20 may use a variety of attachment methods as well as several operating positions as those skilled in the field will see. Additional holes in different positions can be drilled to allow bolt 22 and nut 24 to maintain the deflector 20 in its desired position.

The bracket used to attach the mulcher to the lawn mower can be a variety of materials. It can be aluminum, brass, steel, ect. It may be differrent lengths and have multiple angle iron 42 and lever 44 as the width of the mulcher is increased in width. The lever 44 can be constructed of cast material or formed tubular material or any other rigid material capable of being formed in to a lever that allows movement of the mulcher. Regardless of materials used, the results remain the same.

Also the mulcher is not limited to a lawn mower but can be attached to any piece of equipment that inhales lawn debris from one opening and exhales it out of another as in the case of a lawn vacuum. By installing the mulcher at the exit point the results will be the same as when used on a lawn mower.

Accordingly the scope of the invention should be determined not by the embodiments illustrated, but by the appended claims and their legal equivalents.

I claim:

1. A leaf mulcher when attached to a rotary lawn mower deck or lawn vacuum discharge opening, slices leaf matter as said leaf matter is forced through said leaf mulcher by means of a blade rotating within said lawn mower deck or said lawn vacuum, thereby mulching said leaf matter below lawn surface after exiting said leaf mulcher comprising:
   (a) a removalbly mountable housing over said discharge opening whereby all lawn matter exiting said opening passes through said housing which is enclosed on all sides,
   (b) a cutter grid that is inserted in said housing and held in place by a rod,
   (c) to said cutter grid are blades attached, spaced and spanning the width of said housing, thereby allowing edges of said blades to align with the path of said exiting leaf matter,
   (d) a deflector positioned at outer end of said housing that aims in the downward direction, and
   (e) a bracket with a movable and removable lever which attaches said housing to the lawn equipment.

2. The mulcher attachment of claim 1, wherein the edge of said cutter blades are in the position that the natural path of said lawn matter exiting said lawn equipment is sliced as it exits said lawn equipment.

3. The mulcher attachment of claim 2 where said cutter grid is held in position by a rod so as to allow movement of said cutter grid.

4. The mulcher attachment of claim 2 wherein a lever is attached to said cutter grid thereby limiting downward movement of said cutter grid.

5. The mulcher attachment of claim 2 wherein spacing of said cutter blades allows for sufficient air movement between said cutter blades.

6. The mulcher attachment of claim 1 wherein said deflector is adjustable as a means to direct flow of said lawn debris.

7. The mulcher attachment of claim 1 wherein said attaching bracket permits quick removal of said mulcher thereby allowing standard attachments to be used in connection with said lawn equipment.

8. The mulcher attachment of claim 7 wherein said lever used to attach said mulcher to said bracket allows for movement of said mulcher without removing said mulcher from said lawn equipment.

9. The mulcher attachment of claim 7 wherein said lever has multiple holes thus allowing adjustment of said mulcher in relation to said lawn mower deck or said lawn vacuum discharge opening.

* * * * *